United States Patent [19]
Fletcher et al.

[11] Patent Number: 6,009,274
[45] Date of Patent: Dec. 28, 1999

[54] METHOD AND APPARATUS FOR AUTOMATICALLY UPDATING SOFTWARE COMPONENTS ON END SYSTEMS OVER A NETWORK

[75] Inventors: Rick Fletcher; Pei-Chen Lin, both of San Jose, Calif.

[73] Assignee: 3Com Corporation, Santa Clara, Calif.

[21] Appl. No.: 08/881,517

[22] Filed: Jun. 24, 1997

Related U.S. Application Data

[63] Continuation-in-part of application No. 08/766,274, Dec. 13, 1996
[60] Provisional application No. 60/040,876, Mar. 21, 1997.

[51] Int. Cl.⁶ .................................................... G06F 9/445
[52] U.S. Cl. ........................ 395/712; 709/221; 709/217; 713/1; 713/100
[58] Field of Search ........................... 395/712, 651–653, 395/200.33, 200.32, 200.47, 200.49, 200.51, 200.52; 707/10, 203; 713/1, 2, 100; 709/221, 222, 202, 203, 217, 219

[56] References Cited

U.S. PATENT DOCUMENTS

| | | | |
|---|---|---|---|
| 5,421,009 | 5/1995 | Platt ......................................... | 395/712 |
| 5,655,081 | 8/1997 | Bonnell et al. ..................... | 395/200.32 |
| 5,732,275 | 3/1998 | Kullick et al. ........................... | 395/712 |
| 5,752,042 | 5/1998 | Cole et al. ............................... | 395/712 |
| 5,764,992 | 6/1998 | Kullick et al. ........................... | 395/712 |
| 5,805,897 | 9/1998 | Glowny ................................... | 395/712 |
| 5,835,911 | 11/1998 | Nakagawa et al. ..................... | 707/203 |
| 5,870,610 | 2/1999 | Beyda ..................................... | 395/712 |

FOREIGN PATENT DOCUMENTS

| | | |
|---|---|---|
| 0 573 248 A1 | 12/1993 | European Pat. Off. . |
| 0 726 664 A2 | 8/1996 | European Pat. Off. . |
| WO 96/38955 | 12/1996 | WIPO . |

OTHER PUBLICATIONS

Greenfield, "Network Management Filters Down to the Desktop," Data Communications, vol. 20, No. 13, Sep. 1991, pp. 39, 40,42.

Jander, "Midlevel Managers Ease SNMP Information Overload," Data Communications, vol. 22, No. 17, Nov. 1993, pp. 53, 54, 56, 58.

Jander, "Lightening the Load on Management Stations," Data Communications, vol. 23, No. 9, Jun. 1994, pp. 45, 46.

Johnson, "A three–Layered Solution for Managing the Enterprise," Data Communications, vol. 24, No. 8, Jun. 1995, pp. 41, 42.

Larsen, "Mastering Distributed Domains via the Web," Data Communications, vol. 25, No. 7, May 1996, pp. 36, 38.

Lee, "A Distributed Network Management System," Procedings of the Global Telecommunications Conference, San Francisco, CA, Nov. 28–Dec. 2, 2994, vol. 1, Nov. 1994, Institute of Electronics Engineers, pp. 548–552.

Roberts, "RMON Adapters Shed Light on LANs," Data Communications, vol. 25,No. 6, May, 1996, pp. 43, 44.

Schwager, "Remote Network Monitoring MIB," Annual Review of Communications, National Engineering Consortium, Chicago, IL, vol. 46, Jan. 1992, pp. 752–754.

Stallings, "Patching the Cracks in SNMP," Byte, vol. 21, No. 8, Aug. 1996, pp. 55–56.

*Primary Examiner*—Tariq R. Hafiz
*Assistant Examiner*—Tuan Q. Dam
*Attorney, Agent, or Firm*—Townsend and Townsend and Crew LLP; Kenneth R. Allen

[57] ABSTRACT

A method and apparatus for automatically updating software components in one or more agents (end systems) in a network. An ASU server generates a multicast request to agents within its network domain, identifying the newest, available versions of software components that may be installed on the agents. Agents compare installed versions with the newest versions and respond to the server request by indicating components that need to be updated. Components include network and non-network software as well as operating system (OS) software. The ASU server then transmits the requested components to the requesting agents in a self extracting compressed file. The file is installed and the components updated without rebooting system software.

45 Claims, 3 Drawing Sheets

| LAYER NAME (NUMBER) | DTA STACK | DATA | PROTOCOLS |
|---|---|---|---|
| HIGHER LAYER PROTOCOLS | | | |
| APPLICATION (7) | MANAGER APP | PROTOCOLS PACKETS/MIBs | SNMP, FTP, HTTP |
| PRESENTATION (6) | | | DATA ENCRYPTION/ COMPRESSION |
| SESSION (5) | | SESSIONS | FULL/HALF DUPLEX |
| TRANSPORT (4) | | PACKET STREAM | TCP, UDP |
| ROUTING (3) | DTA DRIVER | ROUTING PACKETS | IP |
| DATA LINK (2) | NIC (DTA DRIVER) | PACKETS | ETHERNET |
| PHYSICAL (0,1) | ADAPTOR | BITS | ETHERNET |

HIGH / LOW

METHOD AND APPARATUS FOR AUTOMATICALLY UPDATING SOFTWARE COMPONENTS ON END SYSTEMS OVER A NETWORK

This application claims priority from provisional patent application Ser. No. 60/040,876 filed Mar. 21, 1997. This application is a continuation-in-part of Ser. No. 08/766,274 filed Dec. 13, 1996.

BACKGROUND OF THE INVENTION

This invention relates to transmission of information between multiple digital devices on a network. More particularly, this invention relates to a method and apparatus for automatically updating and distributing executable files and components via a network in a distributed fashion.

Related technology is discussed in co-assigned co-pending U.S. patent applications Ser. Nos. 08/506,533, entitled METHOD AND APPARATUS FOR ASYNCHRONOUS PPP AND SYNCHRONOUS PPP CONVERSION, filed Jul. 25, 1995; 08/502,835 entitled VIRTUAL NETWORKING ARCHITECTURE filed Jul. 14, 1995, and 08/542,157, entitled METHOD AND APPARATUS FOR TRANSPARENT INTERMEDIATE SYSTEM BASED FILTERING ON A LAN OF MULTICAST PACKETS, filed Oct. 12, 1995 and incorporated herein by reference to the extent necessary to understand the invention.

Networking Devices Standards

This specification presumes some familiarity with the general concepts, protocols, and devices currently used in LAN networking applications and in WAN internetworking applications. These standards are publicly available and discussed in more detail in the above referenced and other co-assigned patent applications.

This specification also presumes some familiarity with the specific network and operating system components discussed briefly in the following paragraphs, such as the simple network management protocol (SNMP) for management of LAN and WAN networks, and the RMON MIBs defined for remote network monitoring and management.

General Network Topology

Figure 1:
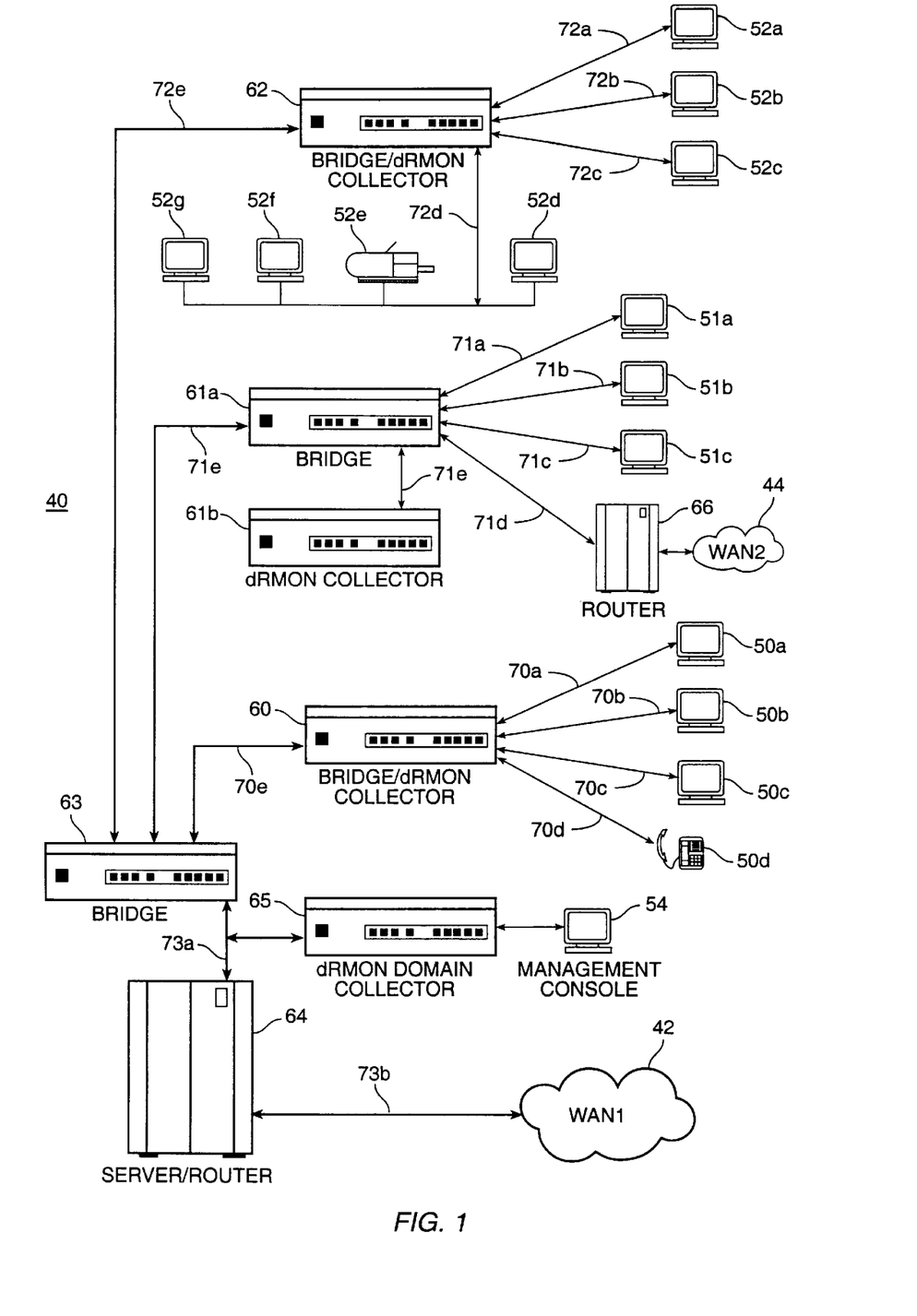
FIG. 1 is a diagram of a local area network of one type in which the invention may be effectively employed.

FIG. 1 illustrates a local area network (LAN) 40 of a type that might be used today in a moderate sized enterprise as an example of a network in which the present invention may be deployed. LANs are arrangements of various hardware and software elements that operate together to allow a number of digital devices to exchange data within the LAN and also may include internet connections to external wide area networks (WANs) such as WANs 42 and 44. Typical modern LANs such as 40 are comprised of one to many LAN intermediate systems such as 60–63 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN intermediate systems 60–63 are referred to as bridges or switches or hubs and WAN ISs 64 and 66 are referred to as routers, however many different LAN configurations are possible, and the invention is not limited in application to the network shown in FIG. 1.

Packets

Figure 2:
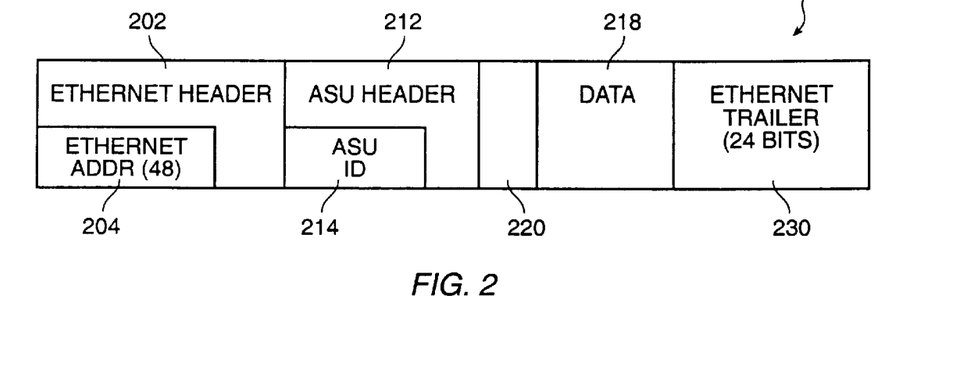
FIG. 2 is a diagram of a packet.

In a LAN such as 40, data is generally transmitted between ESs as independent packets, with each packet containing a header having at least a destination address specifying an ultimate destination and generally also having a source address and other transmission information such as transmission priority. Packets are generally formatted according to a particular protocol and contain a protocol identifier of that protocol. Packets may be encased in other packets. FIG. 2 illustrates a packet 200. Packet 200 is essentially an Ethernet packet, having an Ethernet header 202 and a 48-bit Ethernet address (such as 00:85:8C:13:AA) 204, and an Ethernet trailer 230. Within the Ethernet packet 200 is contained, or encapsulated, an ASU protocol packet, represented by ASU header 212, containing a 32 bit ASU address 214 (such as 199.22.120.33). Packet 200 contains a data payload 218 which holds the data the user is interested in receiving or holds a control message used for configuring the network.

Layers

Figure 3:
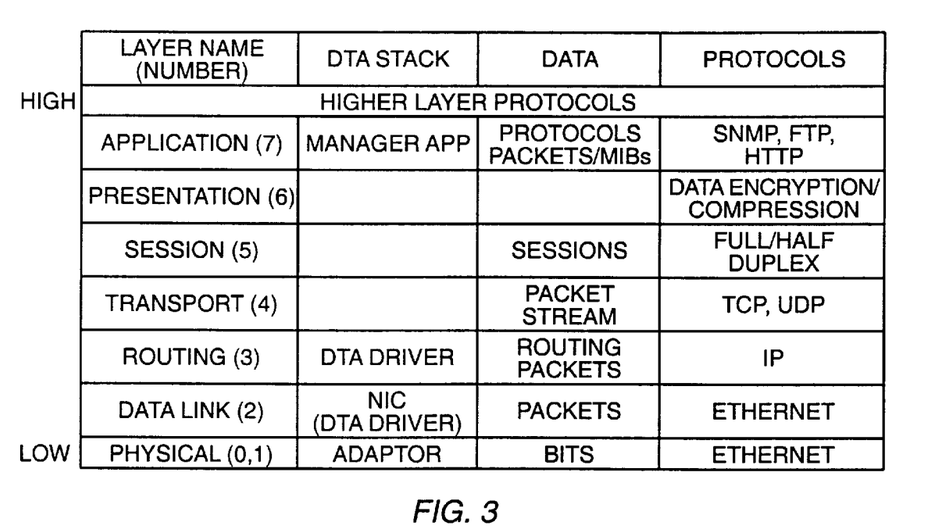
FIG. 3 is a diagram showing a layered network protocol.

Modern communication standards, such as the TCP/IP Suite and the IEEE 802 standards, organize the tasks necessary for data communication into layers. At different layers, data is viewed and organized differently, different protocols are followed, different packets are defined and different physical devices and software modules handle the data traffic. FIG. 3 illustrates one example of a layered network standard having a number of layers, which we will refer to herein as: the Physical Layer, the Data Link Layer, the Routing Layer, the Transport Layer, the Session Layer, the Presentation Layer and the Application Layer. These layers correspond roughly to the layers as defined within the TCP/IP Suite. (The 802 standard and other standards have different organizational structures for the layers.)

Generally, when an ES is communicating over a network using a layered protocol, a different software module may be running on the ES at each of the different layers in order to handle network functions at that layer. Examples of software modules existing within an ES at different layers are shown in FIG. 3.

Drivers and Adapters

Each of the ISs and ESs in FIG. 1 includes one or more adapters and a set of drivers. An adaptor generally includes circuitry and connectors for communication over a segment and translates data from the digital form used by the computer circuitry in the IS or ES into a form that may be transmitted over the segment, which may be electrical signals, optical signals, radio waves, etc. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

NIC Driver

The lowest layer adaptor software operating in one type of network ES is generally referred to as a NIC (Network Interface Card) driver. A NIC driver is layer 2 software designed to be tightly coupled to and integrated with the adaptor hardware at the adaptor interface (layer 1) and is also designed to provide a standardized interface between layer 2 and 3. Ideally, NIC drivers are small and are designed so that even in an ES with a large amount of installed network software, new adaptor hardware can be substituted with a new NIC driver, and all other ES software can continue to access the network without modification.

NIC drivers communicate through one of several available NIC driver interfaces to higher layer network protocols. Examples of NIC driver interface specifications are NDIS (Network Driver Interface Specification developed by Microsoft and 3Com) and ODI (Open Data-Link Interface developed by Apple Computer and Novell).

Generally, when an ES is booting up and begins building its stack of network protocol software, the NIC driver loads first and tends to be more robust than other network software modules because of its limited functions and because it is tightly designed to work with a particular hardware adaptor.

Management and Monitoring of Individual ESs in a Network Environment

A network such as that shown in FIG. 1 is generally managed and monitored within an enterprise by a central Information Services department (ISD), which is responsible for handling all the interconnections and devices shown. The same ISD is generally responsible for managing the applications and system components on each of the individual ESs in the network.

Many prior art systems have been proposed to allow an IS staff person to manage and monitor network infrastructure remotely over a network. Such systems include Intel's LAN-desk, IBM's NetView, HP's OpenView, Norton Administrator, McAfee's ZAC or Novell's Network Management System (NMS). However, these systems generally rely on a full network protocol stack to be correctly running effectively on the remote ES in order to accomplish any remote file management operations. Often, however, ES system trouble or software updates results in one or more network protocol functions becoming non-operational. Under most prior art remote management systems, if any part of the remote ES network protocol stack is not working, the IS manager cannot access an ES through the network and must physically travel to the remote location to fix or diagnose the problem. Also, ISD management becomes extremely expensive in terms of ISD's keeping track of numerous different software modules on sometimes thousands of systems and of installing new versions or minor fixes of software on each system. It has therefore long been a desire of ISD managers and the owners of large numbers of ESs connected on a network to be able to automatically update software components over the network. Such updating ideally would be capable of updating both application software components, system software components, and even network components while the network is running. Such a system should also be able to automatically track version numbers of software in ESs and determine when update components must be downloaded.

Simple Network Management Protocol (SNMP)

A common protocol used for managing network infrastructure over the network is the Simple Network Management Protocol (SNMP). SNMP is a layer 7 network and system management protocol that handles network and system management functions and can be implemented as a driver (or SNMP agent) interfacing through UDP or some other layer 4 protocol. Prior art SNMP installations largely were not placed in ESs because SNMP did not handle ES management or monitoring functions and because SNMP agents are processor and memory intensive.

SNMP is designed to provide a simple but powerful cross platform protocol for communicating complex data structures important to network infrastructure management. However, its power and platform-independent design makes it computationally intensive to implement, and for that reason it has limited applications in end system management or monitoring. It is primarily used in network infrastructure management, such as management of network routers and bridges.

SNMP is designed to support the exchange of Management Information Base (MIB) objects through use of two simple verbs, get and set. MIB objects can be control structures, such as a retry counter in an adaptor. Get can get the current value of the MIB and set can change it. While the SNMP protocol is simple, the MIB definitions can be difficult to implement because MIB ids use complex data structures which create cross-platform complexities. SNMP has to translate these complex MIB definitions into ASN.1 which is a cross-platform language.

Even if installed in an ES, an SNMP agent cannot be used to manage or diagnose an ES or update system components where the UDP protocol stack is not working properly, which will often be the case when the network connection is failing. When working, SNMP provides a protocol interface for higher layer prior art management applications.

SNMP is described in detail in a number of standard reference works. The wide adoption of SNMP throughout the networking industry has made compatibility with SNMP an important aspect of new management and monitoring tools.

Prior Art Update Systems

Prior art systems such as Intel's LAN-desk, and others, allow for the installation and updating of applications remotely. However, those systems are limited to updating application level software components. Also, these systems are limited to using network and higher layer protocols, such as IP and IPX, that can be rendered unusable by seemingly innocuous configuration problems and which therefore become unreachable, remotely. Additionally, the higher layer protocols result in a burdensome use of the network as they generate more control packets relative to the number of packets carrying data than do lower level protocols such as layer 2 protocols. This prevents servers from living in resource limited devices, such as switches, for example. Further, the higher level protocols require a larger application running on an end system (ES), which requires greater system resources.

Prior art systems, such as Intel's LAN-desk, use a "push" technology for updating that forces updating at the end system, and which requires large database management resources to keep track of update statistics such as which end-station received which update, and which end-station still needs to be updated with which components, for example.

Login scripts are used in many prior art systems. Login scripts are executed each time a user logs into the network at an end-system (ES), for example. Login scripts can execute programs at the server, such as programs that inventory component versions running at the ES and that update the ES by "pushing" down components where needed. However, systems using login scripts lack the ability to dynamically update components that are actually running at the ES.

What is needed in the art is a system for automatically installing and updating system level software components (OS), in addition to applications and agent software components, using an improved data link control protocol that requires fewer network resources than conventional protocols and which is less burdensome on network traffic. Also needed in the art is the ability to "pull" components down from a server (i.e., to update software remotely and automatically without requiring that agents automatically receive and load the newest versions of all software now available, but with the ability to support "push" technology if necessary).

For purposes of clarity, the present discussion refers to network devices and concepts in terms of specific examples. However, the method and apparatus of the present invention may operate with a wide variety of types of network devices including networks dramatically different from the specific examples illustrated in FIG. 1 and described below. It is therefore not intended that the invention be limited except as done so in the attached claims.

SUMMARY OF THE INVENTION

The present invention is a method and apparatus for automatic software updating (ASU) in a LAN. According to an embodiment of the invention, ASU agents, which are software or software plus hardware components, are placed within each (or a subset) of the ESs such as 50a–c, 51a–c, and 52a–g, connected to the LAN or within server machines. These agents may also be a part of a larger agent that includes other functions such as implementing prior art RMON functional groups an local packets as described in co-assigned patent applications, Ser. No. 60/040,876, Ser. No. 08/766,274, and Ser. No. 08/881/517.

According to the invention, on an intermittent basis, possibly initiated by a polling packet from the ASU server, the ASU agents forward current version information regarding a subset or all of their software components to an ASU server, existing somewhere on the WAN/LAN. According to the invention, the server may be a stand-alone device connected to the LAN, such as collector 61b or domain collector 65a, or may be implemented within an IS such as server/router 64.

The ASU agents respond to an ASU server request, which indicates one or more software components available from the ASU server. The ASU server stores the agent responses in a server database and updates the agents according to the information provided in the agent responses. According to the invention, the ASU server may generate a table indicating which agents need which software components. When it is time to update the agents, as defined through a user-programmable ASU manager (ASU Mgr.), the ASU server accesses the table and sends out files to the agents. "Safe" communication sessions, governed by the ASU protocol, are established between the ASU server and one or more agents, during which the ASU server transmits files including desired software components in a round robin fashion either on a file-by-file basis, with each agent requesting a particular file receiving that file before the next file is sent out, or on an agent-by-agent basis, with each agent receiving all its requested files before the next agent receives files. The files are then loaded or installed at the agent without having to physically reboot the system. If necessary, a "smart agent" provides updating the system registry "on-the-fly" using two directory paths for those components that cannot be dynamically updated. According to the invention, the registry path is changed to point to a file not currently being used, but that will be used at the next reboot to cause an update to system components.

According to one aspect of the invention, a method is provided for automatically updating software in a network including a server and an agent, comprising the steps of generating a server request, wherein said server request identifies the newest version level of a software component; generating an agent update request if the agent needs said newest version level of said software component; and updating the agent with said newest version level of said software component in response to said update request.

According to another aspect of the invention, a network is provided which comprises a server having a request generator, wherein said server generates a server request, and wherein said server request identifies the newest version level of a software component; an agent, coupled to said server and having an update request generator, wherein said agent receives said server request and generates an update request if said agent needs said newest version of said software component; and wherein said server updates said agent with said newest version level of said software component in response to said update request.

According to yet another aspect of the invention a method is provided for automatically updating software in a network including a server, a first agent and a second agent, comprising the steps of generating a multicast server request, wherein said multicast request identifies the newest version levels for a first software component and a second software component; generating a first agent update request if the first agent needs said newest version of one of said first and second software components; generating a second agent update request if the second agent needs said newest version of one of said first and second software components; and updating the first and second agents with said newest version levels of said first and second software components in response to said first and second update requests.

According to a further aspect of the invention, a network is provided comprising a server having a request generator, wherein said server generates a server request, and wherein said server request identifies the newest version levels of a first software component and a second software component; a first agent, coupled to said server and having an update request generator, wherein said first agent receives said server request and generates an update request if said first agent needs said newest version of one of said first and second software components; a second agent, coupled to said server and having an update request generator, wherein said second agent receives said server request and generates an update request if said second agent needs said newest version of one of said first and second software components; and wherein said server updates said first and second agents with said newest version levels of said first and second software components in response to said first and second update requests.

According to yet a further aspect of the invention, a server is provided for updating software components in agents, the server comprising: a request generator for generating server requests identifying available versions of software components to a plurality of agents; a memory for storing agent update requests generated by any of said agents responding to server requests, wherein said server stores update requests received from said agents, said update requests identifying said available software components required by said responding agents; and an updating mechanism, wherein said server updates said responding agents with said required software components.

The invention will be further understood upon review of the following detailed description in conjunction with the drawings.

DESCRIPTION OF SPECIFIC EMBODIMENTS

FIG. 1 is a block diagram illustrating a LAN/WAN network with ESs having ASU agents and an ASU server according to a specific embodiment of the invention. The invention includes two types of primary components, the agents that reside in ESs and the ASU server that advertises available versions of software components to all agents within its domain and updates those agents in response to agent requests for the newer versions of software components.

ASU Agent

In one embodiment, the ASU agent is implemented in the C programming language. The agent executable code is launched each time an ES is started or rebooted and the agent may be tightly bound to ES adaptor driver software. Because the ASU agent has no visible ES user interface, the ES user is unaware of the agent's presence, and can do nothing with regards to reconfiguring the ES that would inadvertently disable the agent.

ASU Server

The ASU server receives update requests from the agents and sorts and aggregates that information into a cohesive database. The ASU server then uses this information to update agent software components as necessary on an agent-to-agent basis or on a file-by-file basis as will be described in more detail below.

While the invention may be most easily described as a network having a single ASU server, it is possible to have another ASU server on the LAN/WAN assume the update duties of a defective or off-line ASU server.

Figure 4:
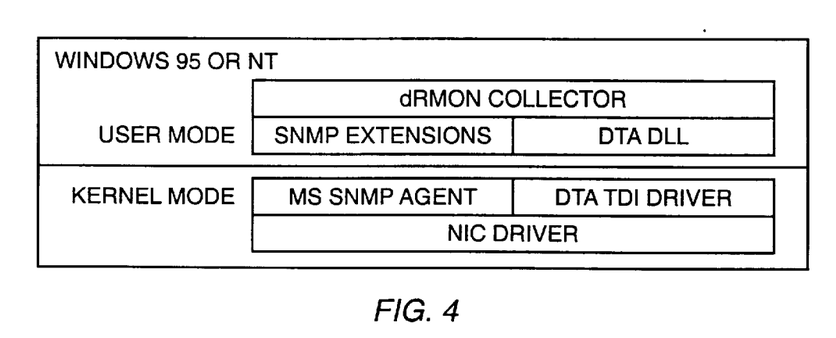
FIG. 4 is a block diagram of an embodiment of an ASU server according to the invention.

FIG. 4 is a block diagram of an embodiment of a ASU server according to the invention. Like the Agent, the ASU server loads automatically when the system starts and depends upon the same Desk Top Agent (DTA) services to exchange ASU protocol traffic with its Agents. The DTA is also used as a packet interface to allow the ASU server to monitor its own directed traffic as well as the broadcast and multicast traffic flowing within its sphere of management.

Protocol for Communications Between ASU Server and Agents

According to the invention, a protocol is defined for communications between a ASU server and its agents. The specific details of the protocol are not necessary for an understanding of the invention, and the protocol may be a prior art network management protocol, such as SNMP or a subset of standards-based SNMP.

However, the invention is also able to work with a simple and more efficient protocol for specifically communicating certain kinds of network management information and this represents a preferred embodiment. A preferred protocol does not require and is not susceptible to configuration by an ES user, so that it is not as easily inadvertently disabled by a user as many other network protocols are. A preferred protocol would bind more directly to a NIC driver so that the protocol will load and be functional even if other network protocol stacks do not load or are not operating properly. A preferred protocol will generally require no acknowledgement by default, but will include the ability to establish acknowledgements for reliability and also to include encryption features for security.

A preferred protocol may be restricted to communication between intermediate system (IS) ASU servers and end system (ES) agents, an area where users do not otherwise need to interface. The ASU server, in one embodiment, is designed to interface with other network management software through a standards based protocol, like SNMP, to facilitate interoperability with network management software.

A preferred protocol will result in lower network traffic, be very reliable and will not require an extensive protocol installation and configuration process at the end-systems. A preferred protocol will be designed with an awareness of the reliability of modern network infrastructures realizing that many prior art protocols are designed with the assumption that network traffic will be very unreliable and that packets will often get dropped or lost after they are transmitted. In modern networks, in fact, packets rarely get dropped once they are sent by the transmitter. A preferred protocol, therefore, eliminates much of the acknowledgement and redundant traffic generated by other network protocols that is unnecessary for reliable network operation but maintains acknowledgment capabilities where necessary.

For the purposes of this description of the invention, we will refer to the ASU protocol to represent the protocol by which ASU servers and agents communicate over the network. Unless the context otherwise requires, the ASU protocol should be understood to represent any possible protocol between ASU servers and agents for the exchange of management information, generally MIBs, including prior art SNMP-type protocols or including a preferred specialized protocol as described above.

Actual File Transfer Process Using Reliable ASU Protocol

As each update component is potentially fairly large, a non-acknowledged preexisting protocol is not sufficient where certain types of packets are allowed to be lost, without retransmission. This makes transmitting large files difficult. Therefore, according to the invention, a "reliable" ASU protocol is defined, which can handle transfer of arbitrarily large files with acceptable error handling capabilities and acceptable recovery from lost packets. Reliable ASU protocol uses an unreliable protocol underneath and performs acknowledgments and error recovery, and uses a window-sliding protocol to achieve reliability.

Update components are transferred from the ASU server to an agent in a "safe" communication session governed by the "reliable" ASU protocol. Individual sessions are set up between each agent and the ASU server after the ASU server has decided to send update files. As above, the ASU server can update a single agent by establishing a single communication session with that agent. In this way, agents are updated in an agent-by-agent manner. In another embodiment, the ASU server establishes multiple, concurrent communication sessions with multiple agents and updates components simultaneously in a file-by-file manner, for example.

In the event that one of the two end nodes, agent (end system) or ASU server, are busy during any established "safe" communication session, the ASU protocol ensures maintenance of the communication session by providing connection oriented protocol functions when necessary. In one embodiment, "keep alive" functionality is provided to keep the session alive (i.e., "keep alive" messages, or packets, flow between agent and ASU server on a periodic basis whether the connection is doing anything or not). As above, acknowledgement functionality is provided in the layer 2 ASU protocol described above, as necessary. Formal responses, or acknowledgements, can be sent on a per-packet basis or based on a group of packets (e.g., using a windowing protocol). Sequence numbering of packets is provided using an additional header 220 in packets as shown in FIG. 2, for example. This header, denoted a "file management header," follows the standard ASU protocol header 212 and also carries protocol-type functions that are typically not part of the ASU protocol. When a "safe" communication session is established the sequence number field, which in one embodiment is a 16-bit field, starts incrementing.

Improved ASU (Automatic Software Upqrader) Agent Updates

When ASU is widely deployed within a large institution, it is impractical to manually update agent software in each ES. Therefore, the system provides a mechanism for automatically updating the ASU agent and all of its components, including the DTA and NIC drivers, via the network. The mechanism is generalizable and may be used to automatically update any number of components, both network and non-network components, including system level (OS) software components. The mechanism for doing this is relatively simple within the ASU environment and takes advantage of the fact that all of the ASU's Agent components are dynamically loadable and unloadable; thus they can be replaced in operation without having to actually reboot the system.

According to an embodiment of the invention, an agent response to an ASU server request is defined to indicate the current version level of all software components in the ES. If the ASU server possesses a newer version of any of those components, the ASU server uses the Down-Load-Module (DLM) capability to transmit to, and execute at, the Agent a self-extracting compressed file with an installer and the needed files within it. The installer replaces the older components with the newer versions, unloads the Agent, and reloads and restarts the Agent and its services. According to another embodiment, the agent response is defined as a specific request for one or more software components advertised by the ASU server as being the most recent versions.

Automatic Software Upgrade (ASU) is included in one embodiment of the invention because of the huge number of ASU agents that will be distributed throughout an enterprise's network. Without ASU, a user or administrator would need to manually install software every time a new upgrade for a component is released and this is prohibitively expensive for any MIS department. With ASU to automatically update any component at the ASU agent (end-system) from the ASU server, updating becomes a relatively painless process. According to a further aspect, this can also be used to help a user install other non-ASU-related components such as NIC drivers, system level (OS) software, etc. from one point per multicast segment or domain.

The ASU includes a number of innovative features in various embodiments to accomplish the auto updating of the network environment.

"Thin" Smart Agent

The "thin" agent is a part of the agent software that implements just enough of the ASU protocol to be able to recognize a poll packet from the ASU server and to determine if a newer version is required of the advertised software component(s). The "thin agent" is loaded and run as a service under Windows 95.

Agents request the new version from the ASU server. The ability in what is called the thin agent is what is the DLM in the agent.

ASU Manager (ASU Mqr.) and ASU Server

To help manage the process of Automatic Software Upgrade, another application, the Automatic Software Upgrade Manager (ASU Mgr.) is created. ASU Mgr. is a process running on a device with access to the network, and can be running on the same hardware as one of the ASU servers as described above. ASU Mgr. discovers all the ASU servers in the enterprise domain, through a poll/response or other mechanism. The ASU manager uses sockets to talk to each ASU server and can display a graphical listing on a management terminal of all the ASU agents in each ASU server's domain, for example. ASU Mgr. allows a user to input and control the files to be updated from an ASU server to the ASU agents. The files are provided to the ASU Mgr. by a user, and the ASU Mgr. in turn uses FTP (or some other file transfer protocol) to transfer these files to ASU servers. Once the ASU server receives the files, the ASU server may transfer the files to the ASU agents. ASU Mgr. also allows a user to program or configure ASU server polling parameters (e.g., when to advertise to agents, when to accept and not accept responses, whether to advertise one component, several components or all components available, etc.) and update parameters (e.g., specifically including or excluding certain time intervals for updating). According to one embodiment of the invention, the ASU Mgr. provides a user with the ability to drill down into the graphical representation of each end node (ASU Agent) to find out information pertinent to the network, such as the current version of each ASU component, user name currently logged in, host name, etc.

Advertising Available Versions of Software Components

The ASU server uses multicast requests, or advertisements, to identify the latest version levels for one or more components that are currently available. The ASU server, in one embodiment, broadcasts out the latest version one component (e.g. from an update list of available ASU agent components, OS components and NIC drivers received from the ASU manager) at a time with unique ids. In other embodiments, the latest versions for all components are broadcast out concurrently or a fixed number of components are broadcast out (e.g. 5 out of 25 new components available). This also helps to keep the load on the server small by helping to prevent the server from being flooded with responses from the agents responding with an update request for all or many of the components advertised. According to the invention, the ASU server sends out a multicast advertisement to all agents in its domain every polling interval, for example. The polling process (requesting, or advertising) is configurable by the user through the ASU manager. The ASU server can be configured to advertise only one component at a time within each polling interval, for example every 15 seconds, or it can be configured to advertise in groups of available software components, including all components at once. In one embodiment, all available components are advertised or announced at least once within a specific time period, for example within a 4 or 5 minute cycle. For example, the ASU server windows through its update directory and advertises one file at a time or 5 files at a time until all files have been advertised within that cycle. After one advertising cycle, the ASU server can begin updating agents. Additionally, the polling process can be configured to be active during a period of time in which updating is inactive or in which accepting agent responses is inactive.

Receiving and Responding to Request by Agent

In one embodiment, ASU agents receive the broadcast information and compare the latest version information with the version levels of the components that they are currently running. If there is any discrepancy, ASU agents with down version components (components that are indicated outdated) respond by requesting updated versions accordingly, and await to be updated upon a scheduled Auto update time slot. A discrepancy exists, for example, where the version of one or more software components currently running at the agent (end system) are older than, or outdated by, the latest or newest version available from the ASU server as indicated in the advertisement(s) received from the ASU server. A discrepancy also exists where no current version of the advertised software component exists at the agent (end system).

In another embodiment of the invention, an agent receives the broadcast information and responds with the agent's current version level of one or more software components that were advertised by the ASU server. The ASU server then compares the agent's current version levels with the latest version levels of the software components.

Agents can make decisions as to whether or not a component should be requested, for example where the component in question may conflict with other components currently running on the agent.

Agents can respond to each advertisement one file at a time (one software component at a time) or grouped per advertisement. For example, if the ASU server sends out an advertisement for 5 software components (out of 25 available), an agent can respond one component at a time (up to 5 times) or it can respond once for all 5 components.

Communication between a ASU agent and ASU server is secure according to the security features described in the above referenced patent applications or in other patent applications.

Preventing Flooding of the ASU Server

If all the agents respond to the multicast advertisement immediately, or with a similar delay, there is a good chance of flooding the ASU server with more packets than it is able to handle. The ASU server in turn may have to drop some packets depending on the buffer-resources available. To avoid this, in one embodiment each agent uses a backoff algorithm that is built into the ASU protocol to calculate the amount of time to wait before sending the response. Ideally, this back-off algorithm is designed to spread responses from the agents as evenly as possible over a period of time, for example with a maximum delay time of 1 second, so that the ASU server can more easily handle all response packets. In one embodiment, an agent uses a random number generator, seeded with the unique MAC address of the ES, to distribute response packets across the desired response time. In other embodiments, agents seed a random number generator with two numbers, one based on a changing value such as a system clock. This redistributes responses from ESs during each response time. Other response distribution algorithms are possible that distribute agent responses, including deterministic algorithms based on the number of agents responding to a given ASU server.

Flooding is also avoided if fewer than all software components available are advertised by the ASU server (i.e., by limiting the number of components advertised).

Sending Files to Agent

Figure 5:
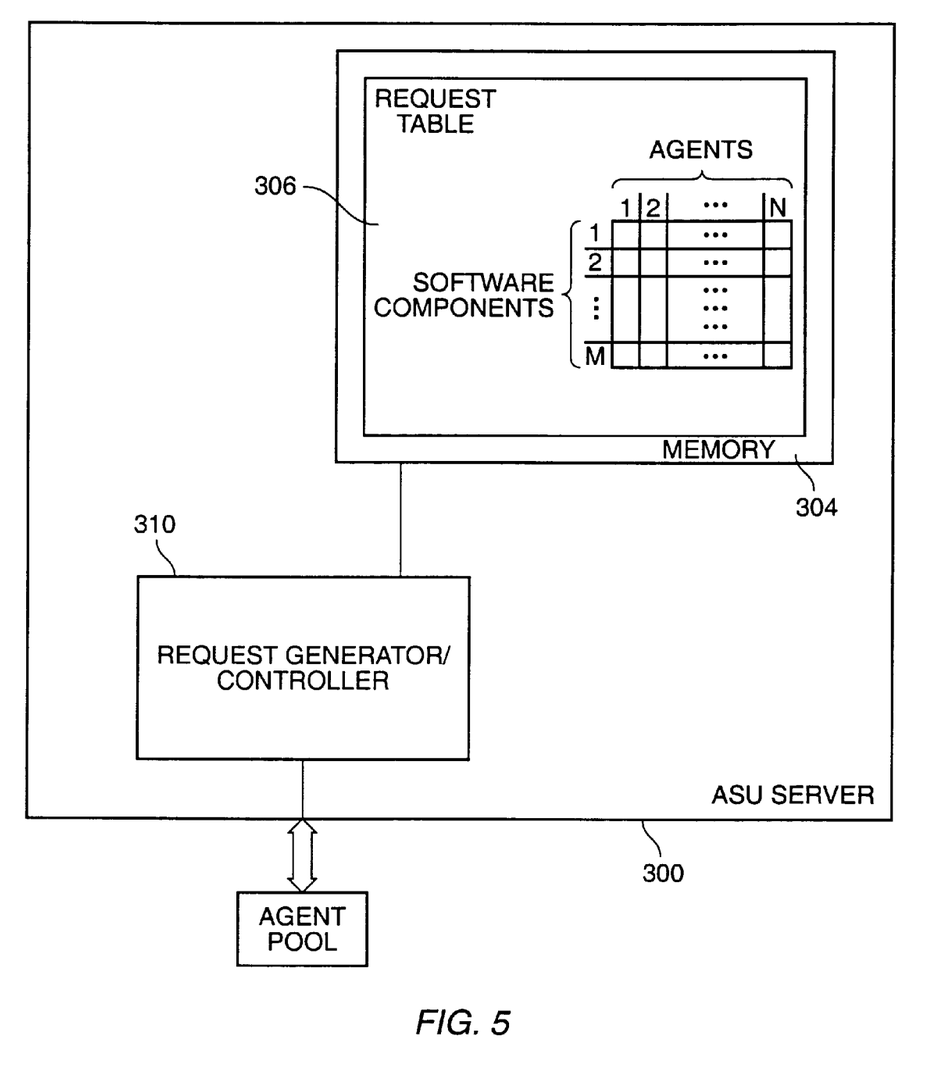
FIG. 5 is a block diagram of an ASU server according to the invention.

According to the invention, the ASU server receives requests from each agent and stores the requests in table form, for example, with each file defining a column entry and each requesting agent defining a row entry. FIG. 5 is a block diagram of an ASU server 300 according to the invention. Request generator/controller 310 is operative to generate and transmit server requests, or advertisements, and to receive agent responses from agents within its domain. Controller 310 is coupled to memory 304. Controller 310 is also operative to generate a response, or update request, table 306 in memory 304, and to access table 306. Although, as shown, each responding agent defines a column, and each requested component defines a row, the invention is not limited to such a configuration. Table 306 may be configured in any manner as is well known in the art.

In one embodiment, once all components in the update directory have been advertised and once all responses (version requests) have been received from the agents, the ASU server sends out files in round-robin fashion within one file type. For example, the ASU server accesses the first column (file) of the request table and sends that file in a point-to-point manner to each agent requesting that file. The ASU server then proceeds to the next column (file) that has at least one agent requesting that file and sends out that file to the requesting agents. In another embodiment, the ASU server engages in a communication session with each agent, during which the ASU server sends out all files requested by that agent. After it has satisfied all of that agents requests, it moves on to the next agent in the table that had requested at least one file. In this embodiment, the ASU server provides updated versions of files to agents on an agent-by-agent basis. In yet another embodiment, the present invention updates multiple agents concurrently. In this embodiment, multiple concurrent communication sessions between the ASU server and multiple smart agents provide the capability to update multiple agents simultaneously. A particular file can be broadcast out to all agents requesting that file, or different files can be sent to different agents simultaneously.

A slow-down mechanism is provided for slowing down, or backing off all together, the file transfer process (background update traffic) as regular network activity increases. Both the server and the agent in a communication session are aware of network traffic through data monitoring of the buffer pools in the agents. Where the buffer pool is completely saturated with regular traffic or network analysis, component updating can be rescheduled for a later time.

An update control file in the ASU server controls the scheduling of the update process. The control file controls the number of nodes (agents) that are updated and when they are updated. For example, if thousands of agents require updating, the control file can schedule updating to be done one agent at a time, or several agents at a time (burst-mode), or even all agents at once. In the meantime, the ASU server can send out poll packets advertising components and can receive update requests concurrent with agent updates. Agents, for example, can request a component over and over until it is actually received by the agent (updated). The same control file that is used to send files to the agents has another section that indicates a time for updating to start that is user-programmable through the ASU manager. The ASU server checks the time, and if it corresponds to the update time it will start by looking at its own database list indicating the agents and the files they need. The ASU server then sends the files to the agents until all files are transferred or until a stop time has been reached. Through the ASU manager, a user can program the ASU server to exclude certain time intervals for updating (e.g., between 9:00 a.m. and 5:00 p.m., when regular network traffic may be heaviest), to include certain time intervals for updating (e.g., between 8:00 p.m. and 10:00 p.m.), to schedule updates at specified intervals (e.g., every 3 minutes), and to set a maximum number of nodes (agents) that can be updated simultaneously (e.g., 10 nodes at a time or 100 nodes at a time). Polling or advertising during any exclusion period still occurs, but responses are not recorded at the ASU during exclusion periods.

Updating at the End System

According to one embodiment of the invention, new files received by an ASU agent (at an end system) are stored in one or more special update directories. These files are copied to their respective directories when all requested files have been received. For ASU components, proper Windows 95 registry entries are modified to reflect Auto update status at the time that files are copied. Because some of the components may be in use at the time of update, the components are not immediately loaded and used. Instead, according to the invention, the Windows 95 operating system registry information is updated to point to the new file components. Then, the next time that the operating system is rebooted, this modified registry information is used by the operating system to pick up the updated components. Updates to some components may be made immediately where allowed by the operating system. For example, .sys files in Windows NT and .vhd files in Windows 95 can be immediately copies over. However, .exe files (and any .dll files associated therewith), when loaded and running cannot be updated until the system is rebooted.

This is distinct from standard windows 95 setup application reboot, where the setup program instructs a user to perform a reboot after installing new components in order to cause the operating system to recognize the need for loading other operating system modules.

The present invention performs updates in one embodiment by providing for two directory paths and updating the registry "on-the-fly" to point to the new update path when all updated components have been received from the network. In this embodiment of the current invention, the registry path is changed to point to a file not currently being used, but that will be used at the next reboot to cause an update to system components. This indirection provides a flexible way for the agent to perform updates on a continuous basis whereby the automatic updates can happen at any time. These updates are facilitated by the presence of the smart agent existing on the ES, always able to be polled by the ASU server to respond to update requests. Many prior art systems required users to log out periodically in order to run a network script to check for new system components. This can cause problems when the network incorrectly logs out a user that the network has incorrectly determined is not using network resources. Some prior art systems have proposed an agent residing on the ES to receive update packets, but these agents cannot perform version control as efficiently as the present invention.

When a system software component of the end-system is updated by the ASU agent, a message is displayed to the user to this effect. This message is customizable on a per component basis by the administrator from the ASU Mgr.

According to one embodiment of the invention, system configuration managers and service managers are used to dynamically update NIC drivers and services while the network is operating (i.e., without having to reboot). The system configuration manager in Windows 95, for example can be used to temporarily unload the NIC driver and unbind the protocols currently bound to it. The configuration manager then reloads the NIC driver, which is the new version, and notifies the different protocols installed on the system to rebind to the NIC driver, all without physically rebooting the system. Using the system service manager of Windows NT, for example, a service can be temporarily stopped and updated without physically rebooting the system. A service is any node that resides in the kernel of the system software that is hidden to the user, and which always launches and runs whether or not a specific user is logged into the system.

In a further embodiment, the ASU server can download a "magic bullet" which executes in its own process space as an independent executable. The "magic bullet" can interface with Windows 95 and force the thin smart agent and all of its components to end and unload. At that time, the "magic bullet" can uncompress the new thin agent executable and reinstall the updated thin agent. The "magic bullet" can then tell the service manager to restart the service which causes the new binary image to be reloaded and then the thin smart agent can reload the needed dynamic components. This implementation works in the Windows NT and more advanced versions of the Windows95 operating system.

The invention has now been explained with reference to specific embodiments. Other embodiments will be apparent to those of ordinary skill in the art upon reference to the present description. It is therefore not intended that this invention be limited, except as indicated by the appended claims.

What is claimed is:

1. A method of automatically updating software in a network including a server and an agent, comprising the steps of:
   a) generating a server request, wherein said server request identifies the newest version level of a software component;
   b) generating an agent update request if the agent needs said newest version level of said software component; and
   c) updating the agent with said newest version level of said software component in response to said update request.

2. The method of claim 1, wherein said step b) of generating an agent update request includes the steps of:
   i) comparing said newest version level with a version level of said software component that is currently installed on the agent; and
   ii) generating said response only if there is a discrepancy between said newest version level and said currently installed version level.

3. The method of claim 1, wherein said update request indicates a version level of said software component that is currently running on the agent, and wherein said step c) of updating the agent includes the steps of:
   i) comparing said newest and said current version levels; and
   ii) updating the agent only if there is a discrepancy between said newest version level and said currently installed version level.

4. The method of claim 1, wherein said step of updating the agent includes the steps of:
   i) transmitting the newest version of said software component to the agent; and
   ii) installing said newest version of said software component without rebooting system software.

5. The method of claim 4, wherein said step of installing includes the steps of:
   i) uncompressing said component;
   ii) replacing said current version with said newest version;
   iii) unloading the agent; and
   iv) reloading and restarting the agent.

6. The method of claim 1, wherein said software component is dynamically loadable and unloadable.

7. The method of claim 1, wherein said software component includes one of network interface card driver software and desktop agent driver software.

8. The method of claim 1, wherein said software component includes an operating system (OS) software component.

9. A network comprising:
   a) a server having a request generator, wherein said server generates a server request on a communication channel, and wherein said server request identifies the newest version level of a software component;
   b) an agent, coupled to said communication channel and having an update request generator, wherein said agent receives said server request and generates an update request if said agent requires said newest version of said software component; and c) wherein said server updates said agent with said newest version level of said software component in response to said update request.

10. The network of claim 9, wherein said agent compares said newest version level with a version level of said software component that is currently installed on said agent, and wherein said agent generates said update request only if there is a discrepancy between said newest version level and said currently installed version level.

11. The network of claim 9, wherein said update request indicates a version level of said software component that is currently installed on said agent, and wherein said server compares said newest version level with said currently installed version level, and wherein said server updates said agent only if there is a discrepancy between said newest version level and said currently installed version level.

12. The network of claim 9, wherein said server updates said agent by transmitting the newest version of said software component to said agent, and wherein said newest version of said software component is installed by said agent without rebooting system software.

13. The network of claim 12, wherein said component includes an installer, and wherein said installer i) uncompresses said component;

ii) replaces said current version with said newest version;

iii) unloads the agent; and iv) reloads and restarts the agent.

14. The network of claim 9, wherein said software component is dynamically loadable and unloadable.

15. The network of claim 9, wherein said software component includes one of network interface card driver software and desktop agent driver software.

16. The network of claim 9, wherein said software component includes an operating system (OS) software component.

17. A method of automatically updating software in a network including a server, a first agent and a second agent, comprising the steps of:

a) generating a multicast server request, wherein said multicast request identifies the newest version levels for a first software component and a second software component;

b) generating a first agent update request if the first agent needs said newest version of one of said first and second software components;

c) generating a second agent update request if the second agent needs said newest version of one of said first and second software components; and d) updating the first and second agents with said newest version levels of said first and second software components in response to said first and second update requests.

18. The method of claim 17, wherein said step of generating a first agent update request includes the steps of:

i) comparing said newest version levels with version levels of said first and second components that are currently installed on the first agent; and ii) generating said first update request only if there is a discrepancy between at least one of said newest version levels and said currently installed version levels of said first agent; and wherein said step of generating a second agent update request includes the steps of:

i) comparing said newest version levels with version levels of said first and second components that are currently installed on the second agent; and ii) generating said second update request only if there is a discrepancy between at least one of said newest version levels and said currently installed version levels of said second agent.

19. The method of claim 17, wherein said first and second update requests indicate version levels of said first and second components that are currently installed on the first and second agents, and wherein said step of updating the first and second agents includes the steps of:

i) comparing said newest version levels with said currently installed version levels of said first agent;

ii) updating the first agent only if there is a discrepancy between at least one of said newest version levels and said currently installed version levels of said first agent;

iii) comparing said newest version levels with said currently installed version levels of said second agent; and iv) updating the second agent only if there is a discrepancy between at least one of said newest version levels and said currently installed version levels of said second agent.

20. The method of claim 17, wherein said step of updating the first and second agents includes the steps of:

i) transmitting the newest version of said first and second software components to the first and second agents; and ii) installing said newest versions of said first and second software components in said first and second agents without rebooting system software.

21. The method of claim 20, wherein said step of installing in said first agent includes the steps of:

i) uncompressing said components;

ii) replacing said first current versions with said newest versions;

iii) unloading the first agent; and iv) reloading and restarting the first agent.

22. The method of claim 17, wherein said first and second software components are dynamically loadable and unloadable.

23. The method of claim 17, wherein said first software component includes one of network interface card driver software and desktop agent driver software.

24. The method of claim 17, wherein said step of updating the first and second agents includes the step of generating a table indicating the version levels of said first and second software components required by said first and second agent.

25. The method of claim 20, wherein said step of updating further includes the steps of:

updating said first agent with said newest version of said first software component if said first software component is indicated in said table; thereafter updating said second agent with said newest version of said first software component if said first software component is indicated in said table; thereafter updating said first agent with said newest version of said second software component if said second software component is indicated in said table; and thereafter updating said second agent with said newest version of said second software component if said second software component is indicated in said table.

26. The method of claim 20, wherein said step of updating further includes the steps of:

updating said first agent with said newest version of said first software component if said first software component is indicated in said table; thereafter updating said first agent with said newest version of said second software component if said second software component is indicated in said table; thereafter updating said second agent with said newest version of said first software component if said first software component is indicated in said table; and thereafter updating said second agent with said newest version of said second software component if said second software component is indicated in said table.

27. A network comprising:
a) a server having a request generator, wherein said server generates a server request on a communication channel, and wherein said server request identifies the newest version levels of a first software component and a second software component;
b) a first agent, coupled to said communication channel and having an update request generator, wherein said first agent receives said server request and generates an update request if said first agent requires said newest version of one of said first and second software components;
c) a second agent, coupled to said communication channel and having an update request generator, wherein said second agent receives said server request and generates an update request if said second agent requires said newest version of one of said first and second software components; and
c) wherein said server updates said first and second agents with said newest version levels of said first and second software components in response to said first and second update requests.

28. The network of claim 27, wherein said first agent compares said newest version levels with a version level of said first and second software components currently installed on said first agent, and wherein said first agent generates said first update request only if there is a discrepancy between at least one of said newest version levels and said currently installed version levels of said first agent.

29. The network of claim 27, wherein said first and second update requests indicate version levels of said first and second software components currently installed on said first and second agents, and wherein said server compares said newest version levels with said currently installed version levels, and wherein said server updates said first and second agents only if there is a discrepancy between at least one of said newest version levels and said currently installed version levels.

30. The network of claim 27, wherein said server updates said first and second agents by transmitting the newest version of said software components to said first and second agents, and wherein said newest version of said software components are installed by said agents without rebooting system software.

31. The network of claim 30, wherein said transmitted components each include an installer, and wherein said installer
i) uncompresses said component;
ii) replaces said current version with said newest version;
iii) unloads the agent; and
iv) reloads and restarts the agent.

32. The network of claim 27, wherein said first and second software components are dynamically loadable and unloadable.

33. The network of claim 27, wherein said first software component includes one of network interface card driver software and desktop agent driver software.

34. The network of claim 27, wherein said first software component includes an operating system (OS) software component.

35. The network of claim 27, wherein said server includes a table generator for generating a table indicating the version levels of said first and second software components required by said first and second agent.

36. A server for updating software components in agents, the server comprising:
a request generator for generating server requests on a communication channel, said server requests identifying available versions of software components to a plurality of agents;
a memory for storing agent update requests generated by any of said agents responding to server requests, wherein said server stores update requests received from said agents, said update requests identifying said available software components required by said responding agents; and
an update mechanism, wherein said server updates said responding agents with said required software components.

37. The server of claim 36, wherein said update requests are stored in said memory in a table format wherein each of said responding agents defines a column, and wherein each required software component defines a row.

38. The server of claim 37, wherein said server updates said responding agents with said required software components on a row-by-row basis.

39. The server of claim 37, wherein said server updates said responding agents with said required software components on a column-by column basis.

40. The server of claim 36, wherein said update mechanism is configurable to include a certain time period for updating, wherein updating occurs during said included time period.

41. The server of claim 36, wherein said update mechanism is configurable to exclude a certain time period for updating, wherein updating does not occur during said excluded time period.

42. The server of claim 36, wherein said request generator is configurable to generate a first server request for a first one of said available software components and a second server request for a second one of said available software components.

43. The server of claim 36, wherein said request generator is configurable to generate a first server request for a plurality of said available software components.

44. The server of claim 36, wherein said request generator is configurable to generate a multicast request to all of said plurality of agents simultaneously.

45. The server of claim 36, wherein said request generator is configurable to generate a first request to a first one of said plurality of agents and a second request to a second one of said plurality of agents.

* * * * *